United States Patent
Sagardoyburu et al.

(10) Patent No.: US 11,921,371 B2
(45) Date of Patent: Mar. 5, 2024

(54) METHOD OF FABRICATING A LIQUID CRYSTAL DISPLAY DEVICE AND A LIQUID CRYSTAL DISPLAY DEVICE

(71) Applicant: The Swatch Group Research and Development Ltd, Marin (CH)

(72) Inventors: Michel Sagardoyburu, Neuchâtel (CH); Simon Springer, Berne (CH)

(73) Assignee: The Swatch Group Research and Development Ltd, Marin (CH)

( * ) Notice: Subject to any disclaimer, the term of this patent is extended or adjusted under 35 U.S.C. 154(b) by 243 days.

(21) Appl. No.: 17/486,177

(22) Filed: Sep. 27, 2021

(65) Prior Publication Data

US 2022/0197084 A1   Jun. 23, 2022

(30) Foreign Application Priority Data

Dec. 21, 2020   (EP) .................................. 20216141

(51) Int. Cl.
*G02F 1/1335* (2006.01)
*G02F 1/13357* (2006.01)
(Continued)

(52) U.S. Cl.
CPC .. *G02F 1/133555* (2013.01); *G02F 1/133536* (2013.01); *G02F 1/133608* (2013.01); *G02F 1/1343* (2013.01); *G04G 9/12* (2013.01)

(58) Field of Classification Search
CPC ......... G02F 1/133555; G02F 1/133536; G02F 1/133608
See application file for complete search history.

(56) References Cited

U.S. PATENT DOCUMENTS

| 5,926,293 A | 7/1999 | Ralli |
| 2002/0015836 A1 | 2/2002 | Jonza et al. |

(Continued)

FOREIGN PATENT DOCUMENTS

| CN | 101964162 A | * | 2/2011 |
| JP | 6-258632 A | | 9/1994 |

(Continued)

OTHER PUBLICATIONS

KR20100039401A machine translation (Year: 2010).*

(Continued)

*Primary Examiner* — Lucy P Chien
(74) *Attorney, Agent, or Firm* — Oblon, McClelland, Maier & Neustadt, L.L.P.

(57) ABSTRACT

A method of fabricating a liquid crystal display device including a reflective or transflective liquid crystal cell whose liquid crystal molecules are aligned in a planar or vertical manner, this liquid crystal cell being formed of a transparent front substrate located on the side of an observer, and a rear substrate, also transparent, which extends beneath the front substrate, parallel to and at a distance from the latter, these two front and rear substrates being joined to each other with a sealing frame which defines a sealed enclosure in which a liquid crystal composition is confined, the front and rear substrates being coated on their opposite faces with electrically conductive transparent electrodes and counter-electrodes, the optical properties of the liquid crystal composition being modified by application of an electric field at the point of intersection between an electrode and a corresponding counter-electrode.

31 Claims, 9 Drawing Sheets

(51) Int. Cl.
*G02F 1/1343* (2006.01)
*G04G 9/12* (2006.01)

(56) References Cited

U.S. PATENT DOCUMENTS

| | | |
|---|---|---|
| 2003/0165085 A1 | 9/2003 | Brewer et al. |
| 2003/0165086 A1 | 9/2003 | Brewer et al. |
| 2003/0198141 A1 | 10/2003 | Brewer et al. |
| 2007/0153162 A1 | 7/2007 | Wright et al. |
| 2019/0162876 A1* | 5/2019 | Mashima .............. C08F 287/00 |

FOREIGN PATENT DOCUMENTS

| | | | |
|---|---|---|---|
| JP | 11126027 A * | 5/1999 | |
| JP | 11-167351 A | 6/1999 | |
| WO | WO-2004036300 A1 * | 4/2004 | ....... G02F 1/133536 |

OTHER PUBLICATIONS

European Search Report dated Jun. 3, 2021 in European Application 20216141.0, filed on Dec. 21, 2020, citing documents AA-AE therein, 3 pages (with English Translation of Categories).
Japanese Office Action dated Nov. 8, 2022 in Japanese Patent Application No. 2021-179957 (with English translation), citing references 15 and 16 therein, 9 pages.

\* cited by examiner

METHOD OF FABRICATING A LIQUID CRYSTAL DISPLAY DEVICE AND A LIQUID CRYSTAL DISPLAY DEVICE

CROSS-REFERENCE TO RELATED APPLICATION

This application claims priority to European Patent Application No. 20216141.0 filed on Dec. 21, 2020, the entire disclosure of which is hereby incorporated herein by reference.

FIELD OF THE INVENTION

The present invention concerns a method of fabricating a liquid crystal display device as well as a liquid crystal display device obtained by this method. The present invention particularly concerns a fabrication method for providing a liquid crystal display device with a decorative and/or functional pattern visible through a transparent display surface of said liquid crystal display device.

BACKGROUND OF THE INVENTION

The present invention relates to display devices of the digital type, i.e. display devices which are capable of displaying information in alphanumeric form, as opposed to analogue display devices which display information by means of one or more hands which move in relation to graduations.

A well-known family of digital display devices consists of liquid crystal display devices. These liquid crystal display devices conventionally comprise a liquid crystal cell formed of a transparent front substrate on the side of an observer, and a rear substrate, which may or may not be transparent, which extends parallel to and at a distance from the front substrate. These two front and rear substrates are usually joined to each other by a sealing frame which defines a sealed enclosure in which a liquid crystal composition is confined. Finally, the front and rear substrates are coated on their opposite faces with electrically conductive transparent electrodes and counter-electrodes; applying an electrical field between an electrode and corresponding counter-electrode changes the optical properties of the liquid crystal composition at the crossing point of the electrode and counter-electrode concerned.

In the context of the present invention, we are concerned with the following types of liquid crystal cells:
Twist Nematic or 'TN';
Super Twist Nematic or 'STN',
Guest Host;
Vertically Aligned or VA'; and
Electrically Controlled Birefringence or 'ECB'.

To be able to operate in reflective mode, TN, STN, Guest Host or VA or ECB type liquid crystal cells must be provided with a reflective polarizer, which, usually, is laminated on a lower face of the rear substrate and whose function is to reflect the light that enters the liquid crystal cell through the front face of the latter and passes through the entire liquid crystal cell, until it is reflected on said polarizer.

There are several types of reflective polarizers which, depending on the case, provide specular or diffuse reflection. A first type of reflective polarizer consists of an absorbent/transparent type polarizer. This type of polarizer absorbs a first component of light and transmits the other component of light polarized in a direction orthogonal to that of the first component. To form the reflective polarizer, the underside of the absorbent/transparent polarizer is fitted with a reflector, for example a thin metallic layer of aluminium or silver, on which the light transmitted by the absorbent/transparent polarizer is reflected and returned up through the liquid crystal cell, towards the observer.

In the case of a transflective type liquid crystal cell, i.e. which is both reflective and transparent, the polarizer must be partially reflective and transparent. In order to obtain such a polarizer, which is both partially reflective and transparent, one solution consists in reducing the thickness of the metallic layer coating the absorbent polarizer to a very low value—on the order of a few nanometres—which is precisely controlled. This type of transflective liquid crystal cell is then fitted with a backlight device arranged beneath the rear substrate and which emits light through the partially reflective/transparent polarizer towards the top of the liquid crystal cell.

Another solution to allow a TN, STN, Guest Host, VA or ECB liquid crystal cell to operate in reflective mode consists in providing such a liquid crystal cell with a reflective/transparent polarizer which reflects one direction of polarization of light, and which is transparent for the orthogonal direction of polarization of light. This type of reflective/transparent polarizer may be of the 'Coextruded Multilayer Birefringent Interference Polarizer' type such as that marketed by 3M under the brand name Dual Brightness Enhancement Film or of the 'Wire-Grid Polarizer' type. The reflective/transparent polarizer is secured, for example by lamination, to the underside of the rear substrate, and a black or coloured background layer is subsequently added to absorb the light that must not be reflected. In the case where it is desired to obtain a transflective liquid crystal cell, the black or coloured background layer will be only partially absorbent to allow the light produced by a backlight device arranged beneath the rear substrate to pass through.

There are also display devices comprising a liquid crystal cell provided with a single polarizer on an upper face of its front substrate, while a metal reflector is arranged between its front substrate and its rear substrate.

The prior art liquid crystal display devices which include a TN, STN, Guest Host, VA or ECB display cell thus display information in the form of alphanumeric characters or icons which stand out on a homogeneous flat background layer, of the specular or diffusing type. There are, therefore, few possible variations in appearance between these prior art liquid crystal display devices, such that it is difficult for manufacturers to stand out from one another. Likewise, objects which are provided with such liquid crystal display devices, such as, in particular, wristwatches, are of very similar appearance.

SUMMARY OF THE INVENTION

It is an object of the present invention to overcome the aforementioned problems, in addition to others, by providing a fabrication method making it possible to produce liquid crystal display devices of the reflective or transflective type whose appearance can be infinitely varied. It is also an object of the present invention to provide liquid crystal display devices of the reflective or transflective type which have an original aesthetic appearance.

To this end, the present invention concerns a method of fabricating a liquid crystal display device comprising a reflective or transflective liquid crystal cell whose liquid crystal molecules are aligned in a planar or vertical manner, said liquid crystal cell comprising a transparent front substrate on the side of an observer, and a rear substrate, also transparent, which extends beneath the front substrate, in parallel to and at a distance from the latter, these two front and rear substrates being joined to each other by means of a sealing frame which delimits a sealed enclosure confining a liquid crystal composition, the front and rear substrates being coated on their opposite faces with electrically conductive transparent electrodes and counter-electrodes, the optical properties of the liquid crystal composition being modified by application of an electric field at the point of intersection between an electrode and a corresponding counter-electrode, the liquid crystal display device being provided with a reflective polarizing film arranged to absorb a first component of light which enters the liquid crystal cell through the front substrate, and to reflect a second component of light polarized in a direction orthogonal to that of the first component, the method including the step which consists in embossing the reflective polarizing film to impart thereto a decorative and/or functional shape visible to the observer through the front substrate of the liquid crystal cell, and then securing this reflective polarizing film to an underside of the rear substrate.

According to particular embodiments of the invention:
  the reflective polarizing film is embossed by being pressed against a mould having relief shapes which correspond to the shapes which it is desired to imprint on said reflective polarizing film;
  the polarizing film is pressed against the relief mould by creating an air vacuum;
  during the time that the reflective polarizing film is pressed against the relief mould, said reflective polarizing film is heated;
  the reflective polarizing film is embossed by insert injection moulding;
  once the reflective polarizing film is embossed, there are successively deposited on an upper face of the reflective polarizing film a transparent levelling layer and an adhesive layer by means of which the reflective polarizing film is secured to the liquid crystal cell;
  immediately after the reflective polarizing film is embossed and the transparent levelling layer is deposited, the liquid crystal cell is applied to the transparent levelling layer and the transparent levelling layer is solidified;
  the adhesive layer is formed of an optically transparent adhesive also known as Optically Clear Adhesive or 'OCA' which takes the form of a pressure sensitive film which is laminated to the transparent levelling layer, or which is dispensed as a layer of liquid adhesive on this transparent levelling layer;
  the optically clear adhesive is partially diffusive;
  a transparent levelling layer is deposited on the back of the reflective polarizing film;
  the transparent levelling layer deposited on the upper face of the reflective polarizing film and, where appropriate, the transparent levelling layer deposited on the back of the reflective polarizing film, are obtained by means of a photopolymerizable resin;
  the transparent levelling layer deposited on the upper face of the reflective polarizing film and, where appropriate, the transparent levelling layer deposited on the back of the reflective polarizing film are polymerized by ultraviolet radiation;
  before being embossed, the reflective polarizing film is provided on an upper face with a diffusion layer in order to create an at least partially diffuse reflection;
  the reflective polarizing film comprises a reflective polarizer combined with an at least partially absorbent background layer arranged on the back of the reflective polarizer;
  the at least partially absorbent background layer is black or coloured;
  the black or coloured background layer is an ink layer or a laminated film applied to the back of the reflective polarizer either before the shaping of the reflective polarizer, so that the black or coloured background layer is shaped at the same time as the reflective polarizer, or after the shaping of the reflective polarizer;
  when the background layer is partially absorbent, a backlight device is arranged under said background layer;
  the reflective polarizing film comprises a reflective polarizer combined with an absorbent polarizer which is bonded to the back of the reflective polarizer, the assembly of the two reflective and absorbent polarizers being simultaneously embossed;
  the reflective polarizing film comprises an absorbent polarizer combined with an at least partially reflective polarizer arranged beneath the absorbent polarizer;
  the reflector is metallic;
  when the reflector is partially reflective, a backlight device is arranged beneath the reflective polarizing film.

The present invention also concerns a liquid crystal display device comprising a reflective or transflective liquid crystal cell whose liquid crystal molecules are aligned in a planar or vertical manner, said liquid crystal cell comprising a transparent front substrate on the side of an observer, and a rear substrate, also transparent, which extends beneath the front substrate, in parallel to and at a distance from the latter, these two front and rear substrates being joined to each other by means of a sealing frame which delimits a sealed enclosure confining a liquid crystal composition, the front and rear substrates being coated on their opposite faces with electrically conductive transparent electrodes and counter-electrodes, the optical properties of the liquid crystal composition being modified by application of an electric field at the point of intersection between an electrode and a corresponding counter-electrode, the liquid crystal display device being provided with a reflective polarizing film to absorb a first component of light which enters the liquid crystal cell through the front substrate, and to reflect a second component of light polarized in a direction orthogonal to that of the first component, the reflective polarizing film having decorative and/or functional relief portions visible to an observer through the front substrate of the liquid crystal cell, the reflective polarizing film being secured to an underside of the rear substrate.

According to particular embodiments:
  the reflective polarizing film comprises a reflective polarizer combined with an at least partially absorbent background layer arranged on the back of the reflective polarizer;
  the at least partially absorbent background layer is black or coloured;
  the black or coloured background layer is an ink layer or a laminated film applied to the back of the reflective polarizer;
  the reflective polarizing film comprises a reflective polarizer combined with an absorbent polarizer which is bonded to the back of the reflective polarizer, the assembly of the two reflective and absorbent polarizers being embossed;

the reflective polarizing film comprises an absorbent polarizer combined with an at least partially reflective polarizer arranged beneath the absorbent polarizer;

the reflector is metallic;

when the reflector is partially reflective, a backlight device is arranged under the latter.

The invention also concerns a timepiece comprising a display device of the above type.

As a result of these features, the present invention provides a method of fabricating reflective or transflective liquid crystal display devices which display alphabetic, numerical or other information on embossed backgrounds which have innovative aspects that are very different from one another. This result is achieved by the teaching to imprint relief shapes on the reflective polarizing film which will be visible to the naked eye of the wearer of the watch when said wearer looks at the useful display surface of the liquid crystal cell. In particular, in the case where a liquid crystal display device according to the invention is mounted in a wristwatch, the reflective polarizing film can be embossed to give it a texture imitating the look of conventional watch dials: 'Clous de Paris', 'Côtes de Genève', woven effect, sun-brushed, engine-turned or 'guillochage' dials, etc. It is also possible to imprint simple variations in height on the reflective polarizing film to highlight areas with or without texture, or areas of the useful display surface of the liquid crystal cell where there are display segments. Finally, by means of the invention, it is also possible to imprint figurative patterns on the reflective polarizing film, such as plant patterns, or patterns inspired by cameos, coin faces, sculptures or even bas-reliefs. The present invention thus enables manufacturers of watches or other electronic products comprising a reflective or transflective liquid crystal display device to offer their clients objects whose aesthetic is original and stands out from the competition while using a conventional liquid crystal technology which is well mastered and thus reliable and inexpensive. The possibility offered by the present invention of easily changing the background decoration of a liquid crystal display device allows manufacturers to have a wide range of products each having a different aesthetic appearance, but which are based on a common technological platform, which makes it possible to share production costs. For example, the shape of the segments and icons of a liquid crystal cell according to the invention could be common to several display devices which nevertheless have different decorative and/or technical elements.

BRIEF DESCRIPTION OF THE DRAWINGS

Other features and advantages of the present invention will appear more clearly from the following detailed description of an implementation mode of the method according to the invention, this example being given purely by way of non-limiting illustration with reference to the annexed drawing, in which.

DETAILED DESCRIPTION OF THE INVENTION

Figure 1:
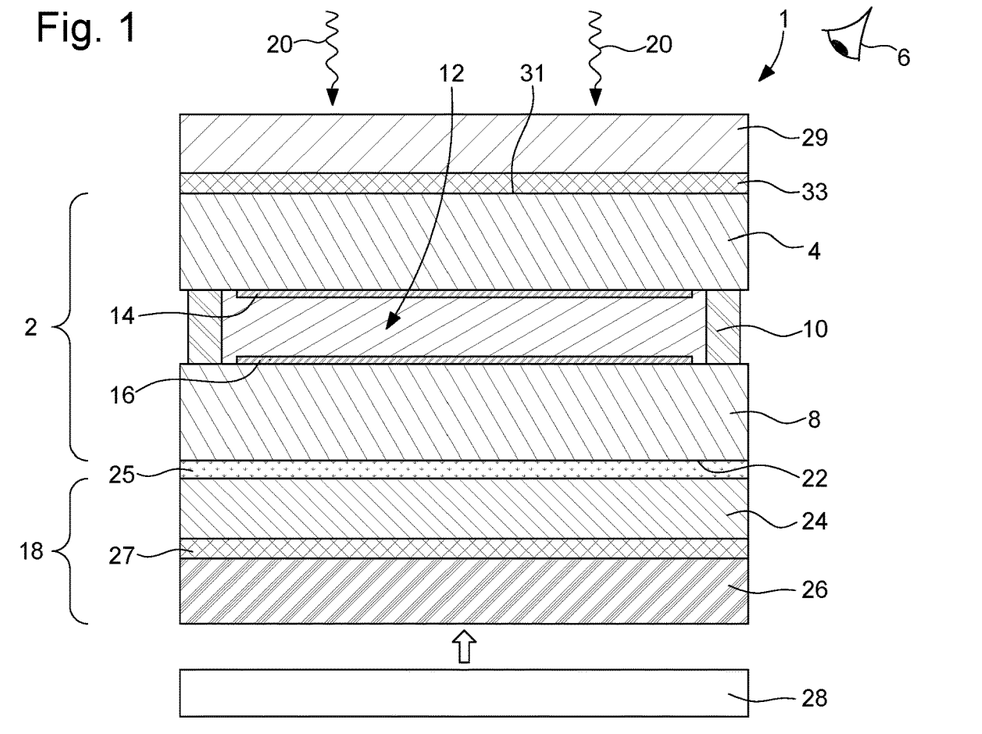
FIG. 1 is a sectional view of a liquid crystal display device comprising a liquid crystal cell provided with a reflective polarizing film comprising a reflective polarizer combined with a black or coloured background layer.

FIG. 1 is a sectional view of a liquid crystal display device designated as a whole by the general reference numeral 1. This liquid crystal display device 1 comprises a liquid crystal cell 2 which comprises a transparent front substrate 4 located on the side of an observer 6, and a rear substrate 8, also transparent, which extends underneath front substrate 4, parallel to and at a distance from the latter. These two front and rear substrates 4, 8 are joined to each other by a sealing frame 10 which defines a sealed enclosure 12 in which a liquid crystal composition is confined. Front substrate 4 and rear substrate 8 are coated on their opposite faces with electrically conductive transparent electrodes 14 and counter-electrodes 16. The optical properties of the liquid crystal composition are modified by application of an electric field at the point of intersection between an electrode 14 and a corresponding counter-electrode 16. Liquid crystal display 2 is provided with a reflective polarizing film 18 arranged to absorb a first component of light 20 which enters liquid crystal cell 2 through front substrate 4, and to reflect a second component of light polarized in a direction orthogonal to that of the first component.

Liquid crystal cell 2 illustrated in FIG. 1 is reflective or at the very least transflective. To this end, this liquid crystal cell 2 is provided with a reflective polarizing film 18 secured to an underside 22 of rear substrate 8. This reflective polarizing film 18 comprises a reflective polarizer 24 combined with a black or coloured background layer 26 which can be formed of an ink layer or a laminated film. Depending on whether background layer 26 is partially or totally absorbent, liquid crystal cell 2 is transflective or respectively reflective. In the case where liquid crystal cell 2 is transflective, a backlight device 28 is arranged under reflective polarizing film 18.

Reflective polarizer 24 is bonded to underside 22 of rear substrate 8 by means of an adhesive layer 25 formed of an optically transparent adhesive also called Optically Clear Adhesive or 'OCA'. Likewise, background layer 26 is bonded underneath reflective polarizer 24 by means of an adhesive layer 27. Finally, liquid crystal cell 2 also comprises an absorbent polarizer 29 bonded to upper face 31 of front substrate 4 by means of an adhesive layer 33.

Figure 2:
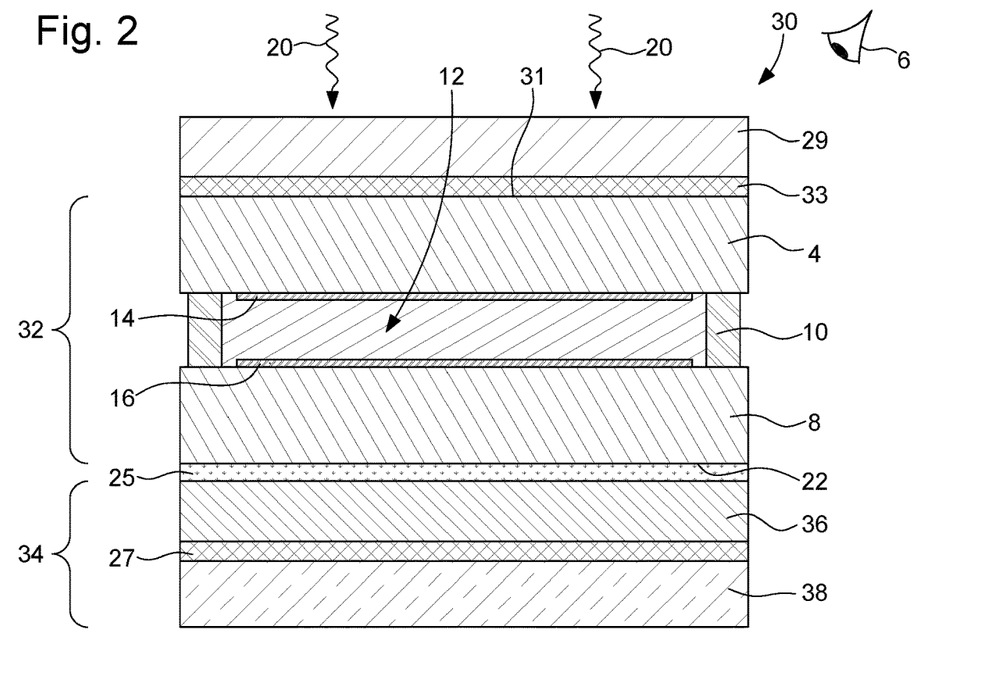
FIG. 2 is a sectional view of a liquid crystal display device comprising a liquid crystal cell provided with a reflective polarizing film comprising an absorbent polarizing film combined with a metal reflector.

FIG. 2 is a sectional view of a liquid crystal display device 30 comprising a liquid crystal cell 32. This liquid crystal display device 30 differs from liquid crystal display device 1 represented in FIG. 1 in that the reflective polarizing film 34 comprises an absorbent polarizer 36 combined with an at least partially reflective reflector 38. When this reflector 38, which is preferably but not exclusively metallic, is only partially reflective, liquid crystal cell 32 is transflective and a backlight device 28 is arranged underneath reflective polarizing film 34.

Like the liquid crystal cell 2 described with reference to FIG. 1, liquid crystal cell 32 is provided with an absorbent polarizer 29 bonded to upper face 31 of front substrate 4 by means of an adhesive layer 33, whereas absorbent polarizer 36 is bonded to underside 22 of rear substrate 8 by means of an adhesive layer 25 and reflector 38 is bonded underneath absorbent polarizer 36 by means of an adhesive layer 27.

The following description will be made with reference to a liquid crystal cell provided with a reflective polarizing film 18 comprising a reflective polarizer 24 combined with an at least partially absorbent black or coloured background layer 26. It goes without saying that this example is given purely by way of illustration and that the same method can be applied to a liquid crystal cell provided with a reflective polarizing film 34 which is composed of an absorbent polarizer 36 and an at least partially reflective reflector 38.

It is sought to imprint on reflective polarizing film 18 relief shapes which will be visible to the naked eye of observer 6 when said observer looks at useful display surface 40 of liquid crystal cell 2. Consequently, when liquid crystal cell 2 is mounted, for example, in a wristwatch, reflective polarizing film 18 can be embossed to give it a texture imitating the look of conventional watch dials: 'Clous de Paris', 'Côtes de Genève', woven effect, sunbrushed, engine-turned or 'guillochage' dials, etc. It is also possible to imprint reflective polarizing film 18 with figurative or technical shapes such as plant patterns, or patterns inspired by cameos, coin faces, sculptures or even basreliefs.

Figure 3:
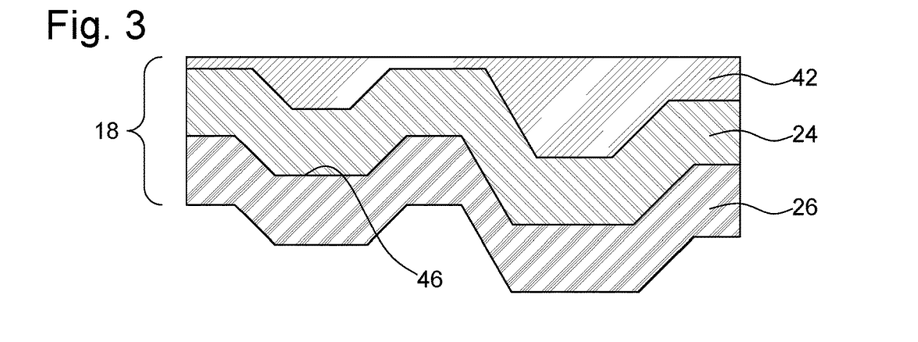
FIG. 3 is a schematic sectional view of a reflective polarizing film comprising a reflective polarizer and a black background layer imparted with relief shapes, the hollows of the reflective polarizing film being filled with a transparent levelling layer.
Figure 4:
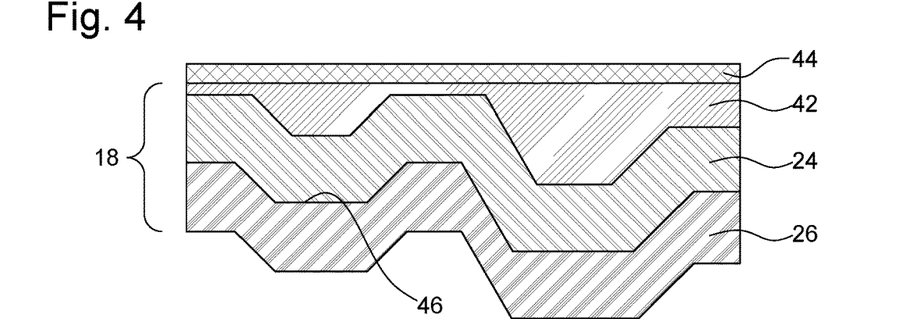
FIG. 4 is a similar view to that of FIG. 3, in which the transparent levelling layer has itself been coated with an optically clear adhesive layer.
Figure 5:
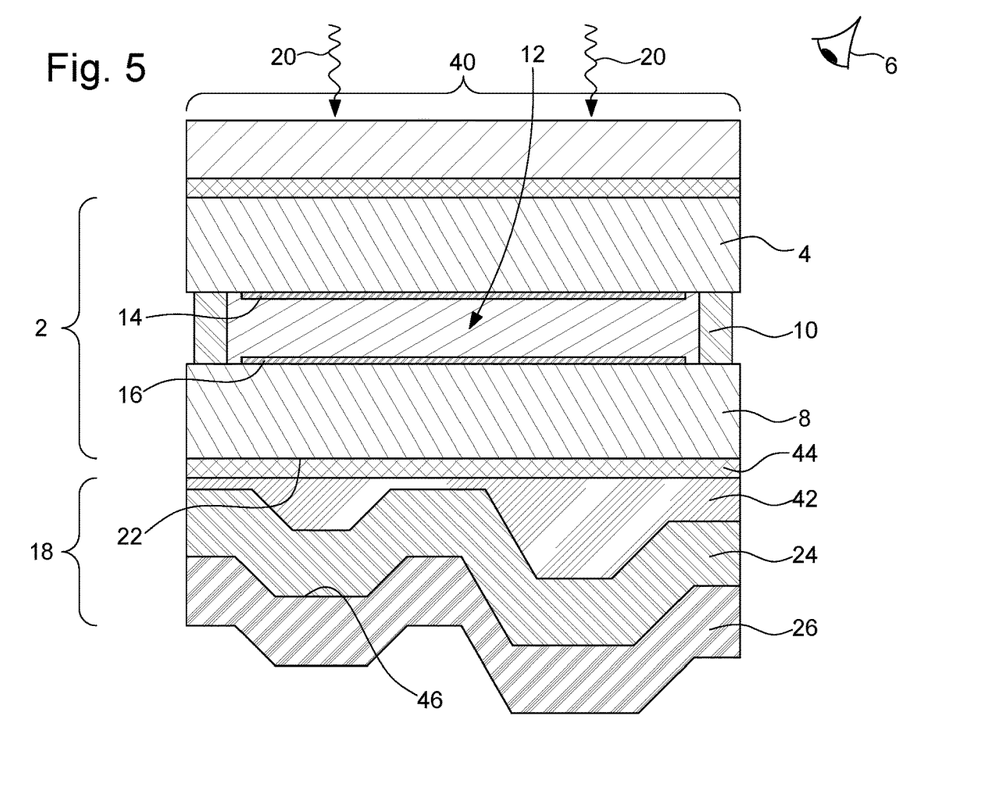
FIG. 5 illustrates the bonding of a reflective polarizing film to the underside of a rear substrate of the liquid crystal cell by means of an optically clear adhesive layer.

To achieve this result, reflective polarizer 24 is embossed by pressing it against a mould having relief shapes which correspond to the shapes which it is desired to imprint on reflective polarizer 24. Preferably, reflective polarizer 24 is pressed against the relief mould by creating an air vacuum and, even more preferably, reflective polarizer 24 is heated, for example by radiation, during the time that it is pressed against the relief mould. Consequently, reflective polarizer 24 faithfully conforms to even the smallest relief details of the mould and sets in this position on cooling. After cooling, a transparent levelling layer 42 (FIG. 3) is deposited in the hollows of reflective polarizer 24. Finally (FIG. 4), transparent levelling layer 42 is coated with an adhesive layer 44 formed of an optically transparent adhesive of the optically clear adhesive or 'OCA' type. This adhesive layer 44 takes the form of a pressure sensitive film which is laminated to transparent levelling layer 42 oriented on the side of liquid crystal cell 2 or is dispensed as a liquid adhesive layer on transparent levelling layer 42. This adhesive layer 44 allows the final bonding of reflective polarizing film 18 to underside 22 of rear substrate 8 of liquid crystal cell 2 (FIG. 5).

Black or coloured background layer 26 is an ink layer or a laminated film applied to back 46 of reflective polarizer 24, either before the shaping of reflective polarizer 24, so that black or coloured background layer 26 is shaped at the same time as reflective polarizer 24, or after the shaping of reflective polarizer 24.

It is therefore understood that it is possible either first to shape reflective polarizer 24 and then coat it with black or coloured background layer 26, or immediately to shape reflective polarizing film 18 formed of a reflective polarizer 24 and its black or coloured background layer 26. For ease of reading and comprehension, it will be assumed in the following description that we are dealing with a complete reflective polarizing film 18.

According to a particular embodiment, complete reflective polarizing film 18 is embossed by being pressed against the relief mould by air vacuum, without applying heat. A transparent levelling layer 42, formed of a photopolymerizable adhesive, for example sensitive to ultraviolet radiation, is then deposited in the hollows of reflective polarizing film 18. Before or after polymerization of transparent levelling layer 42, optically clear adhesive layer 44 is deposited on transparent levelling layer 42.

Figure 6:
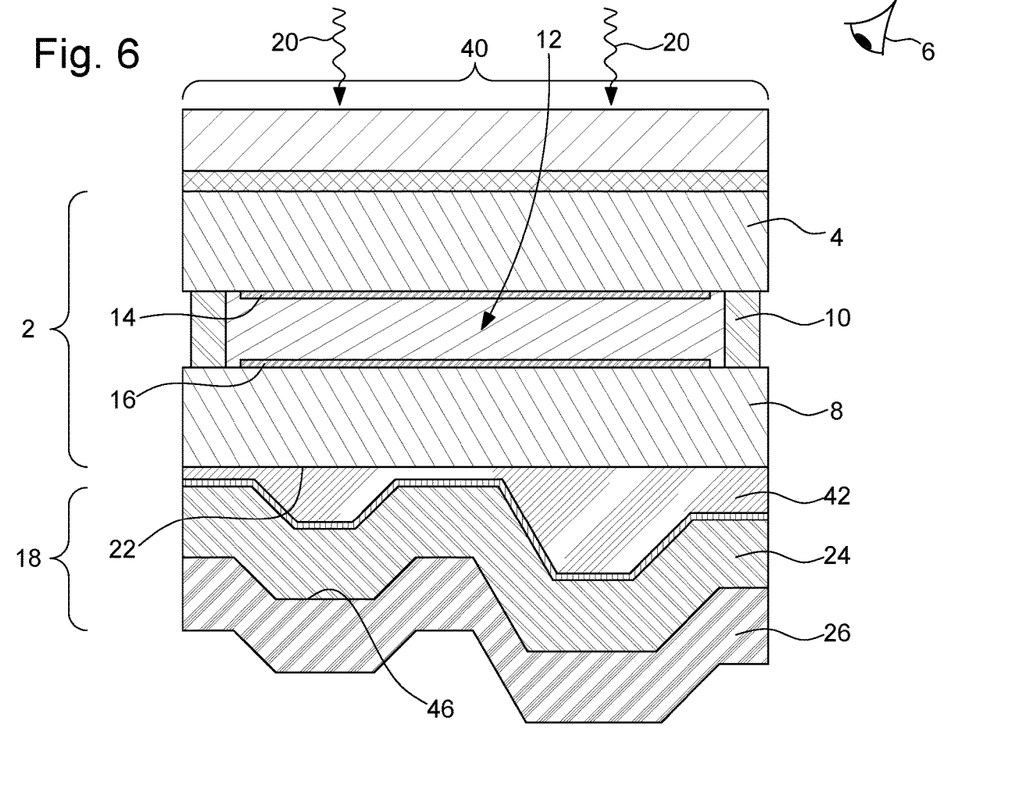
FIG. 6 is a schematic sectional illustration of the bonding of the reflective polarizing film to the underside of a rear substrate of the liquid crystal cell directly by the transparent levelling layer.

According to a particular embodiment illustrated in FIG. 6, immediately after the embossing of reflective polarizing film 18 and the deposition of levelling layer 42 formed of a photopolymerizable resin, reflective polarizing film 18 is applied, via its transparent levelling layer 42, to liquid crystal cell 2 and transparent levelling layer 42 is polymerized by ultraviolet radiation.

According to a variant that is not represented in the drawing, reflective polarizing film 18 is embossed by a method known as Insert-Injection Moulding. This method consists in arranging reflective polarizing film 18 between a mould having relief shapes that correspond to the shapes desired to be imprinted on reflective polarizer 24 and a flat counter-mould. A transparent material, such as an epoxy material, a thermoplastic polymer or a silicone material is then injected between the counter-mould and reflective polarizing film 18. This transparent material will form the transparent levelling layer when the mould is removed. Heated directly or by the injected transparent material, reflective polarizing film 18 is forced to conform to the contours of the mould under the effect of the injection pressure. An adhesive layer can be inserted between the counter-mould and the transparent material, or be applied to the flat face of the transparent levelling material once the mould is removed.

Figure 7:
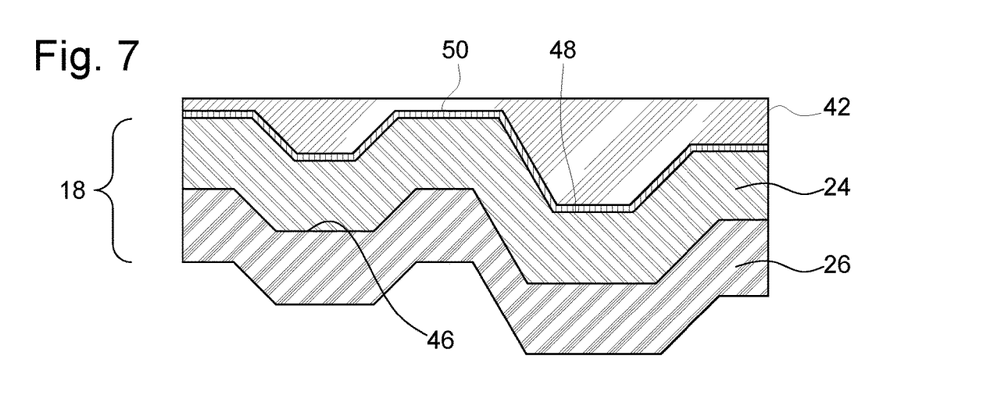
FIG. 7 is a schematic sectional view of an embossed reflective polarizing film with, on the upper face thereof, a diffusion layer creating an at least partially diffuse reflection.
Figure 8:
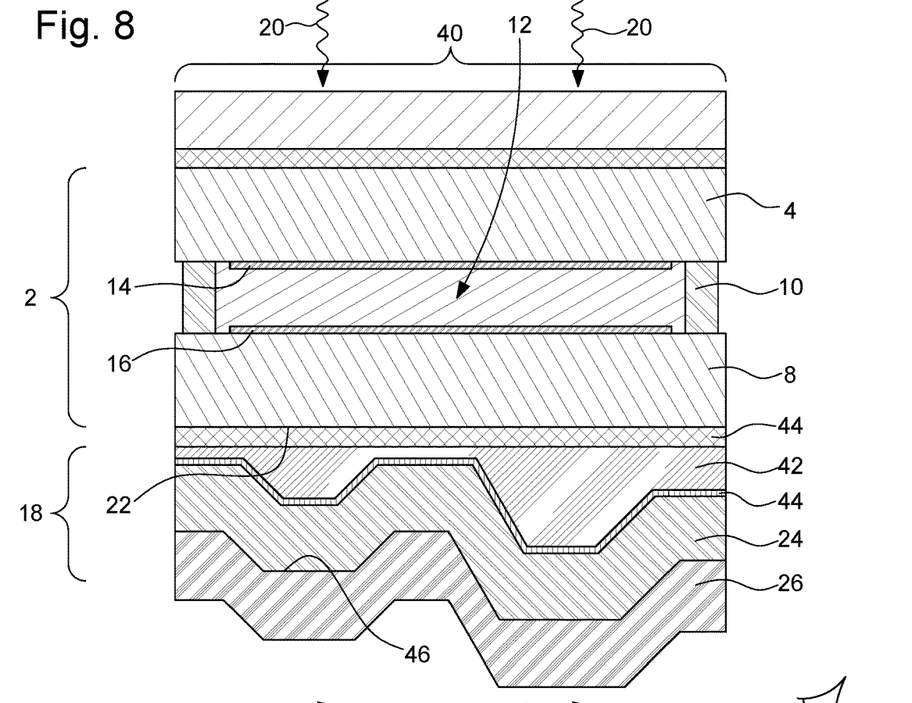
FIG. 8 is a schematic sectional view illustrating the bonding, by means of an optically clear adhesive layer, of the reflective polarizing film provided with a diffusion layer to the underside of the rear substrate of the liquid crystal cell.

In order for the information displayed by liquid crystal cell 2 in the form of alphabetic or numerical characters or icons to stand out on a homogeneous diffusing background layer, it is possible to use at least partially diffusive optically clear adhesive. It is also possible, before embossing reflective polarizing film 18, to provide upper face 48 of the latter with a diffusion layer 50 in order to create an at least partially diffuse reflection (FIG. 7). After the deposition of diffusion layer 50 and the embossing of reflective polarizing film 18, diffusion layer 50 is coated with a transparent levelling layer 42, following which reflective polarizing film 18 is bonded to underside 22 of rear substrate 8 of liquid crystal cell 2 by means of an optically clear adhesive layer 44 (FIG. 8).

Figure 9:
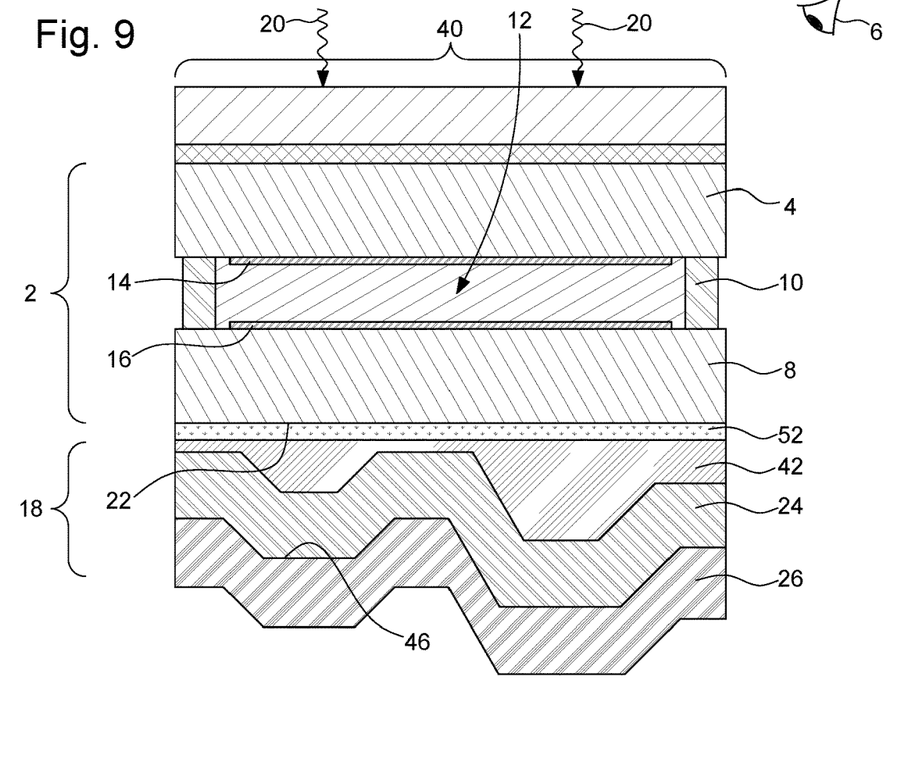
FIG. 9 is a schematic sectional view illustrating the bonding, by means of an optically diffusive adhesive layer, of a reflective polarizing film comprising a reflective polarizer combined with a black or coloured background layer and on which a transparent levelling layer has been deposited.

Likewise, after the embossing of reflective polarizing film 18 comprising a reflective polarizer 24 combined with a black or coloured background layer 26 and deposition of transparent levelling layer 42 in the hollows of reflective polarizing film 18, reflective polarizing film 18 can be fixed to underside 22 of rear substrate 8 of liquid crystal cell 2 by means of an optically diffusive adhesive layer 52 (FIG. 9).

Figure 10:
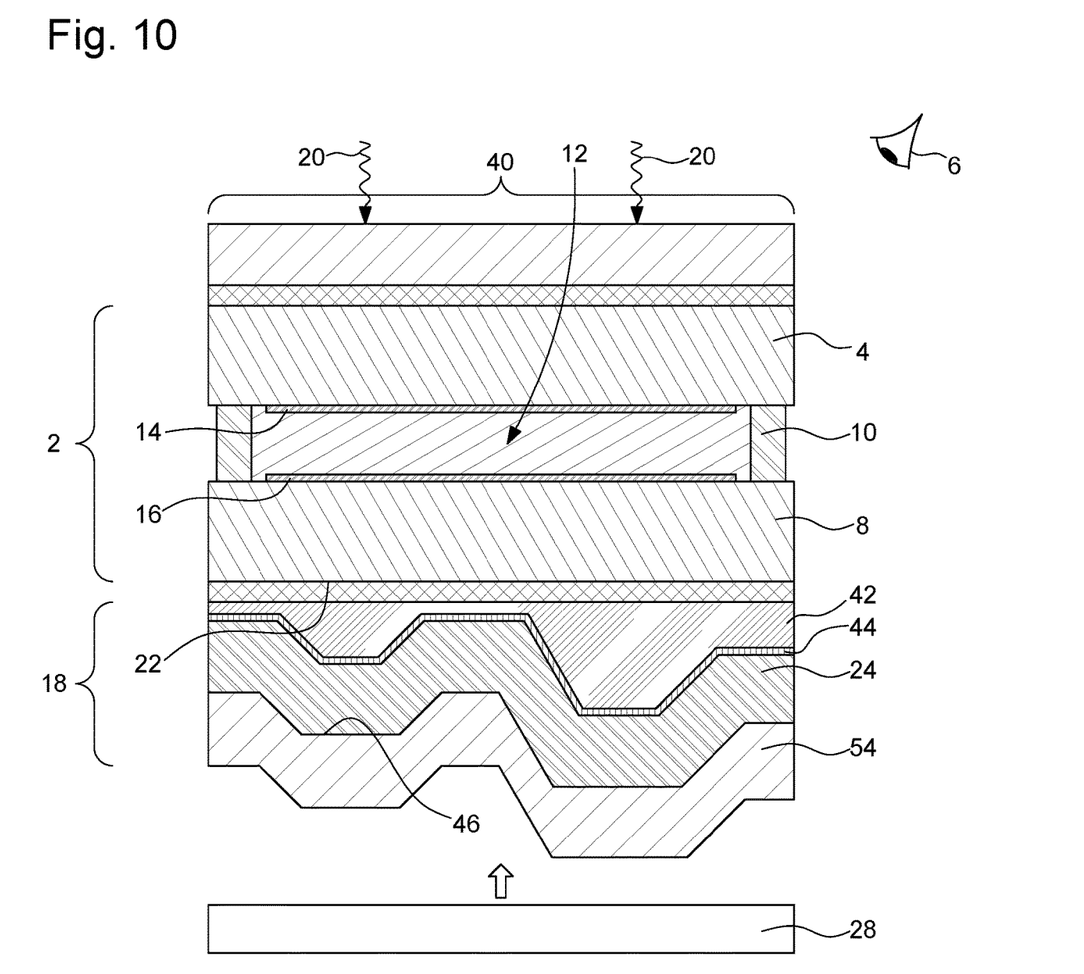
FIG. 10 schematically illustrates a sectional view of an assembly formed of a reflective polarizer and an absorbent polarizer embossed and secured to the underside of a rear substrate of a liquid crystal cell via a transparent levelling layer and an adhesive layer, a backlight device being arranged under this stack.

As seen in FIG. 10, black or coloured background layer 26 applied to back 46 of reflective polarizer 24 is replaced by an absorbent polarizer 54 bonded to back 46 of reflective polarizer 24. The assembly formed by reflective polarizer 24 and absorbent polarizer 54 is then embossed, and then a transparent levelling layer 42 is deposited in the hollows of reflective polarizer 24. This transparent levelling layer 42 is coated with an adhesive layer 44 via which the assembly formed by reflective polarizer 24 and absorbent polarizer 54 is secured to underside 22 of rear substrate 8. Finally, a backlight device 28 is arranged beneath liquid crystal cell 2.

Figure 11:
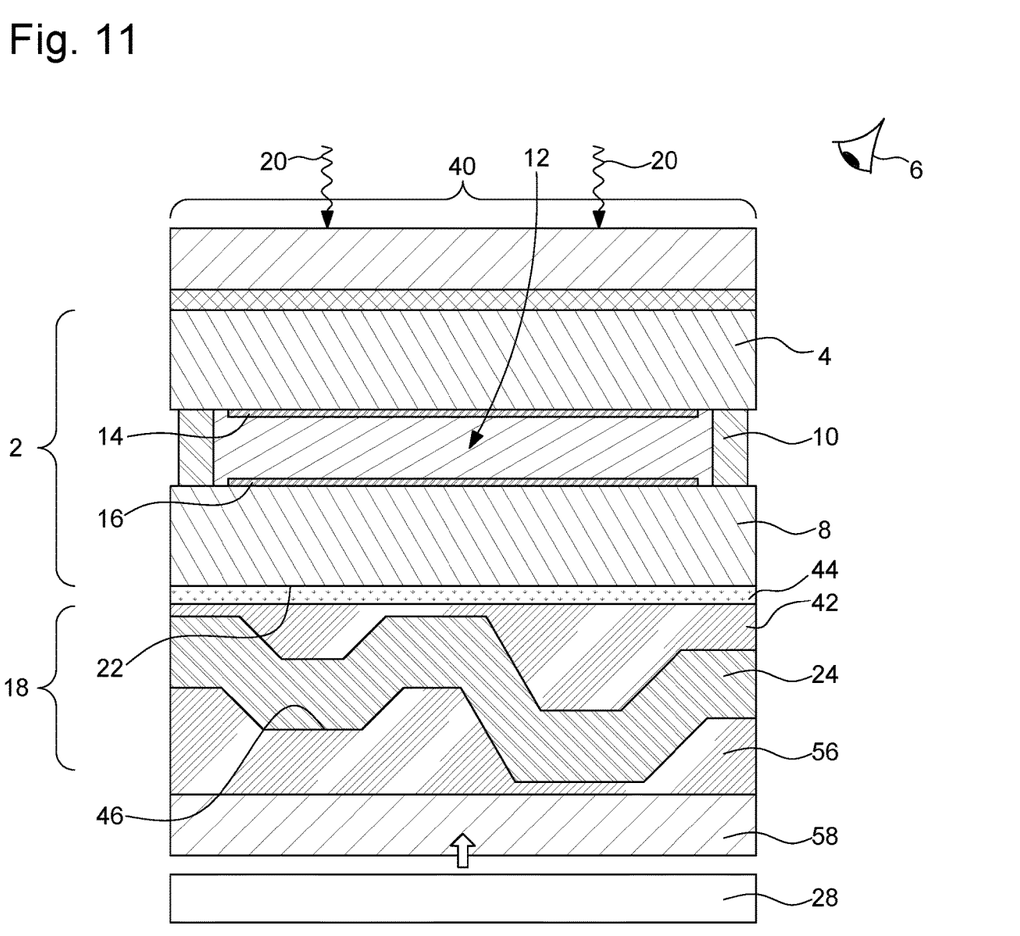
FIG. 11 is a schematic sectional view of a liquid crystal cell provided with a reflective polarizer which, once embossed, receives in the hollows in its back a transparent levelling layer to the flat face of which an absorbent polarizer is laminated, the assembly being completed by a backlight device arranged under the liquid crystal cell.

Likewise, as shown in FIG. 11 annexed to the present patent application, it is also possible to deposit a transparent levelling layer 56 in the hollows of reflective polarizer 24 on the back side 46 of the latter. The flatness of transparent levelling layer 56 can advantageously be used to laminate other films such as an absorbent polarizer 58. The assembly is completed by a backlight device 28 arranged underneath liquid crystal cell 2.

Figure 12:
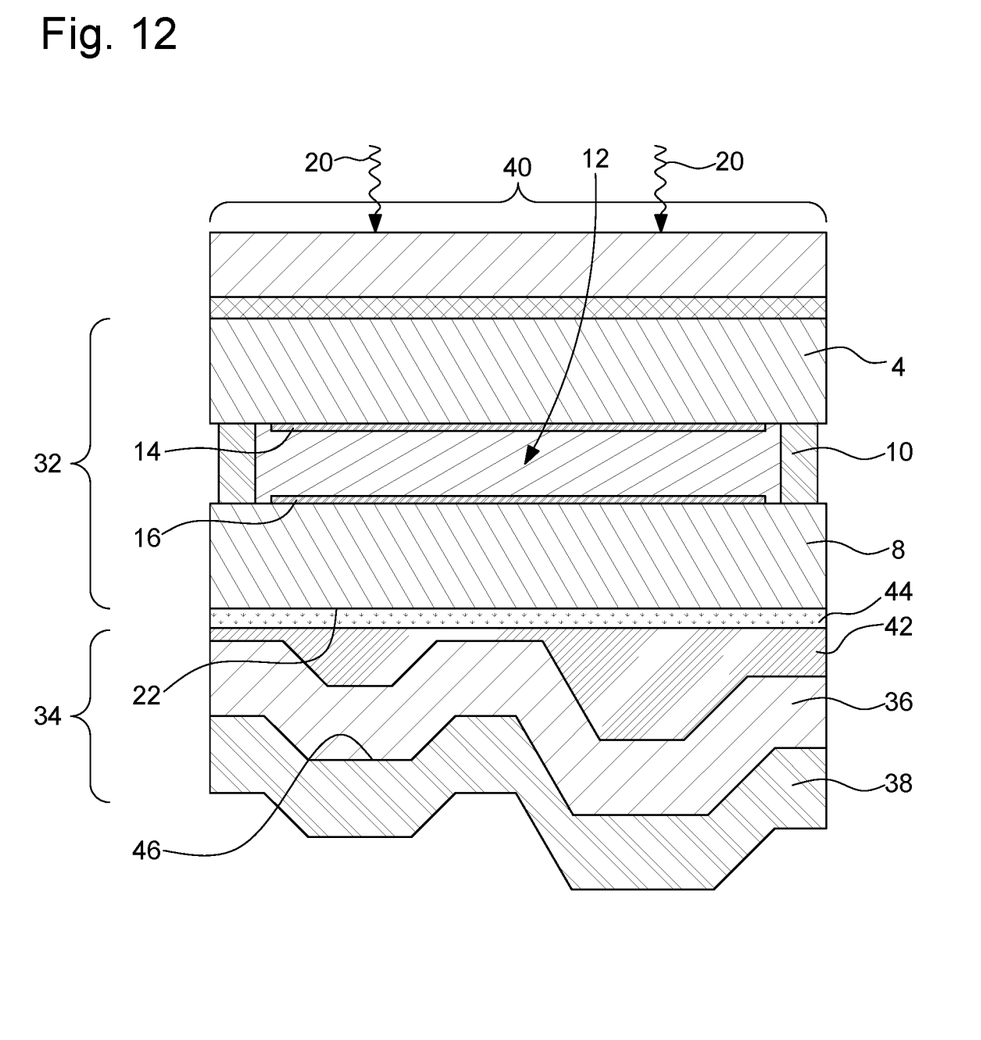
FIG. 12 schematically illustrates a sectional view of a liquid crystal cell provided with a reflective polarizing film comprising an absorbent polarizer combined with a reflective reflector.
Figure 13:
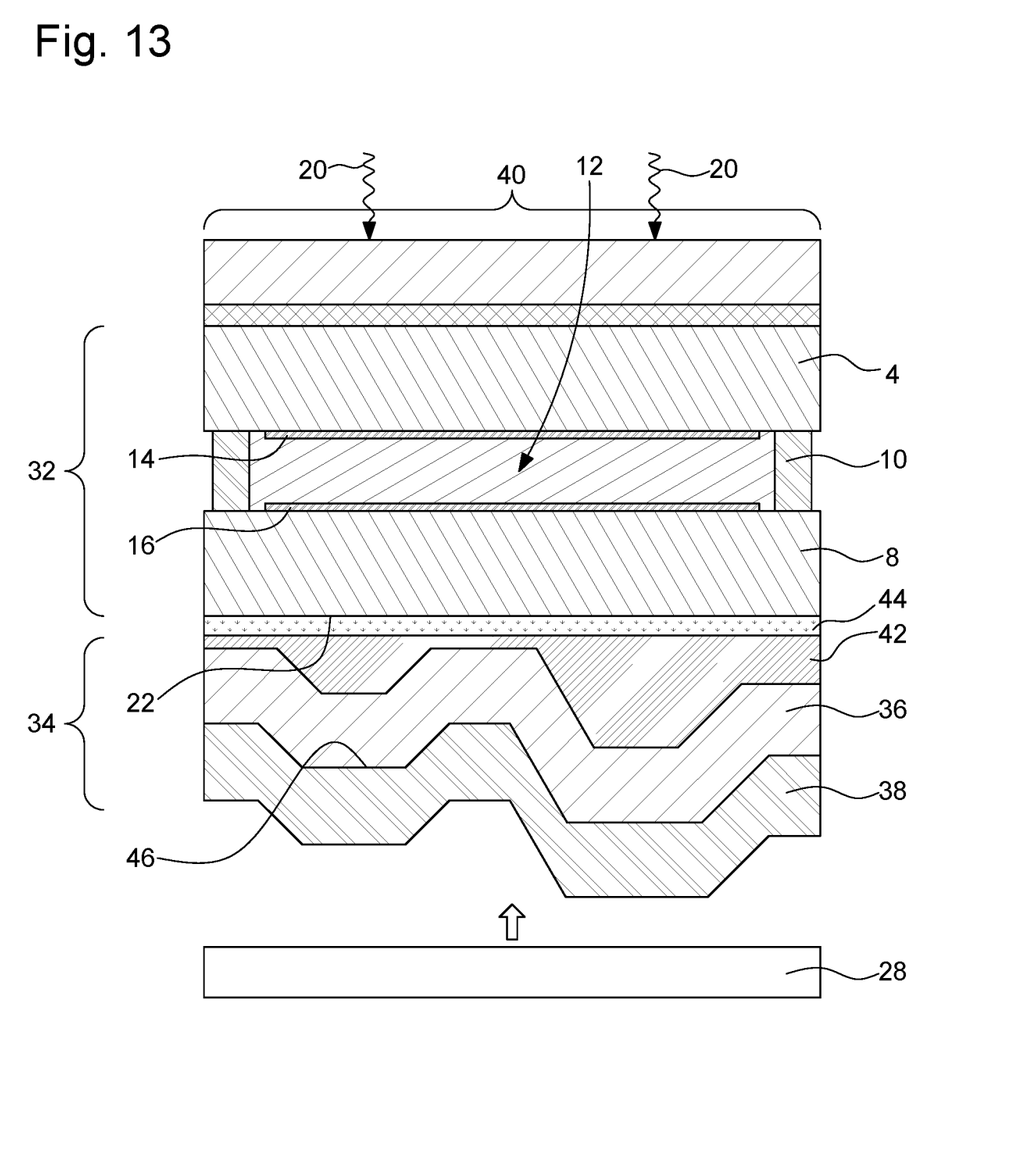
FIG. 13 is a similar view to that of FIG. 12 in which a backlight device is arranged beneath the liquid crystal cell.

The following part of the description referring to FIGS. 12 and 13 relates to the case of liquid crystal cell 32 provided with a reflective polarizing film 34 comprising an absorbent polarizer 36 combined with an at least partially reflective reflector 38. When reflector 38, which is preferably but not exclusively metallic, is only partially reflective, liquid crystal cell 32 is transflective and a backlight device 28 is arranged underneath reflective polarizing film 34. The embossing of the assembly formed by reflective polarizing film 34 and its reflector 38 can be obtained by thermoforming or cold deformation against a mould having relief shapes which correspond to the shapes that it is desired to imprint on reflective polarizing film 34 under the same conditions as those described above with reference to the assembly formed by reflective polarizer 24 and black or coloured background layer 26. Once reflective polarizing film 34 is shaped, a transparent levelling layer 42, consisting, for example, of a photopolymerizable resin sensitive to ultraviolet radiation, is deposited in the hollows of absorbent polarizer 36. Before or after transparent levelling layer 42 is polymerized, optically clear adhesive layer 44, by means of which reflective polarizing film 34 is fixed to underside 22 of rear substrate 8, is deposited on transparent levelling layer 42.

Figure 14:
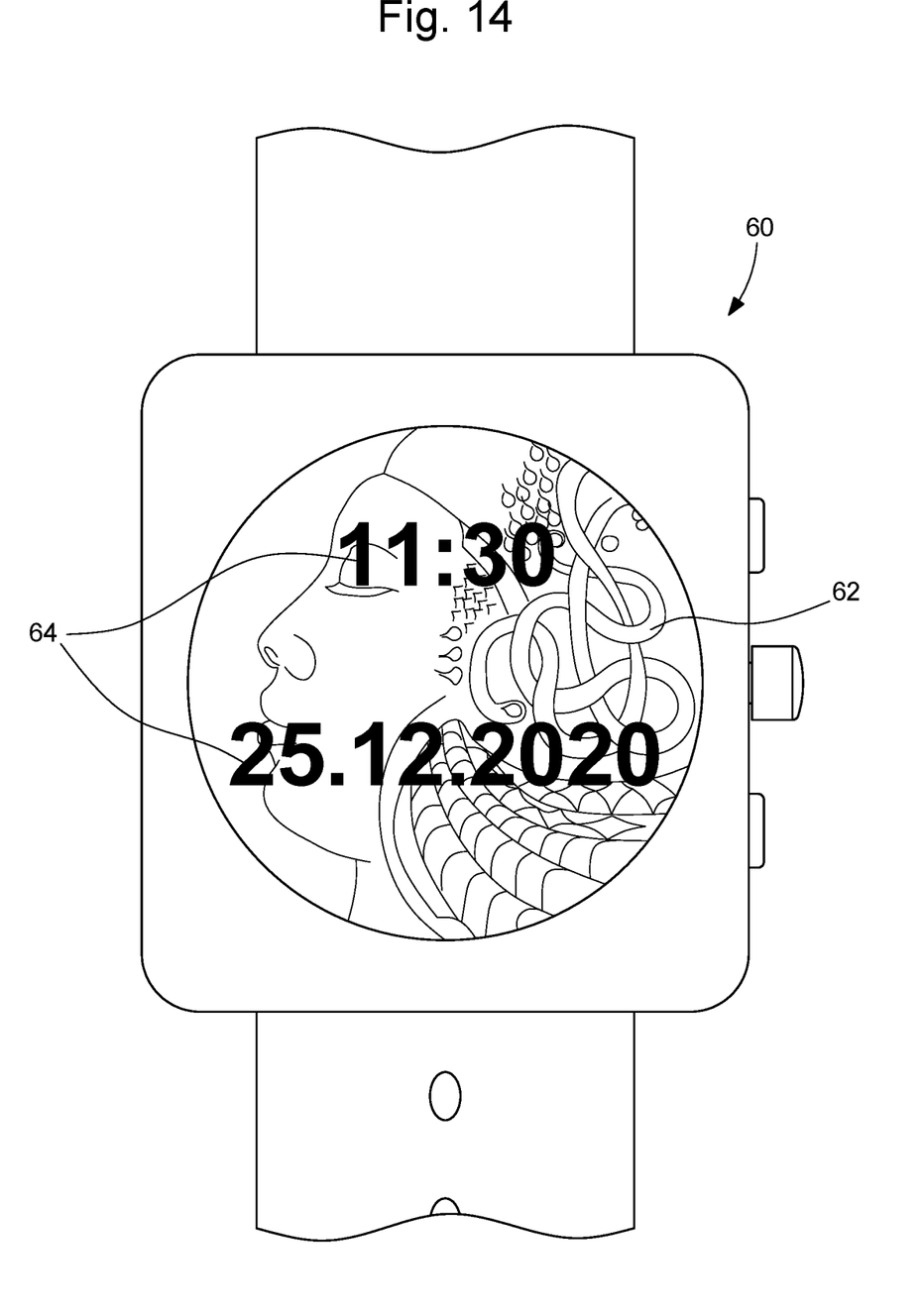
FIG. 14 is a view of a wristwatch provided with a liquid crystal cell whose reflective polarizing film, arranged beneath the liquid crystal display device, has been embossed to display a figurative image of a cameo through the useful display surface of the liquid crystal cell.

FIG. 14 is a view of a wristwatch 60 provided with a liquid crystal cell wherein the reflective polarizing film, arranged beneath the liquid crystal display device, has been embossed to display a figurative image 62 of a cameo through the useful display surface of the liquid crystal cell. It is thus seen that the useful information 64 displayed by the liquid crystal display device is superimposed on figurative image 62 formed in the reflective polarizing film, permanently or on demand, which gives wristwatch 60 a quite remarkable and innovative aesthetic appearance. Evidently, the reflective polarizing film can be shaped to display not a figurative image but technical information, such as, for example, a graduation which will cooperate with information displayed by the liquid crystal display device.

It goes without saying that the present invention is not limited to the embodiments of a reflective or transflective liquid crystal display device that have just been described and that various modifications and simple variants can be envisaged by those skilled in the art without departing from the scope of the invention defined by the annexed claims. It will be recalled in particular that a 'reflective polarizer' means a polarizer that reflects one direction of polarization of light and transmits the orthogonal direction of polarization of light. Likewise, an absorbent polarizer means a polarizer which absorbs one component of light and which transmits the other component of light which is orthogonal to the component of absorbed light. It will also be noted that the present invention applies to reflective or transmissive liquid crystal cells whose liquid crystal molecules are aligned in a planar manner, i.e. with their major axis extending parallel to the liquid crystal cell substrates, or whose liquid crystal molecules are vertically aligned, i.e. with their major axis extending perpendicularly to the liquid crystal cell substrates. Examples of such liquid crystal cells include twisted nematic, super twisted nematic, guest host or vertically aligned or electrically controlled birefringence liquid crystal cells.

NOMENCLATURE

1. Liquid crystal display device
2. Liquid crystal cell
4. Front substrate
6. Observer
8. Rear substrate
10. Sealing frame
12. Sealed enclosure
14. Electrodes
16. Counter-electrodes
18. Reflective polarizing film
20. Light
22. Underside
24. Reflective polarizer
25. Adhesive layer
26. Background layer
27. Adhesive layer
28. Backlight device
29. Absorbent polarizer
30. Liquid crystal display device
31. Upper face
32. Liquid crystal cell
33. Adhesive layer
34. Reflective polarizing film
36. Absorbent polarizer
38. Reflector
40. Useful display surface
42. Transparent levelling layer 44. Adhesive layer
46. Back
48. Upper face
50. Diffusion layer
52. Adhesive layer
54. Absorbent polarizer
56. Transparent levelling layer
58. Absorbent polarizer
60. Wristwatch
62. Figurative image
64. Useful information

The invention claimed is:

1. A method of fabricating a liquid crystal display device comprising a reflective or transflective liquid crystal cell including liquid crystal molecules aligned in a planar or vertical manner, said liquid crystal cell being formed of a transparent front substrate located on the side of an observer, and a transparent rear substrate which extends beneath, parallel to, and at a distance from the front substrate, the front and rear substrates being joined to each other with a sealing frame which defines a sealed enclosure in which a liquid crystal composition is confined, the front and rear substrates being coated on opposite faces thereof with electrically conductive transparent electrodes and counter-electrodes, optical properties of the liquid crystal composition being modified by application of an electric field at a point of intersection between an electrode and a corresponding counter-electrode, the liquid crystal display device being provided with a reflective polarizing film arranged to absorb a first component of light which enters the liquid crystal cell through the front substrate, and to reflect a second component of light polarized in a direction orthogonal to that of the first component, the method comprising:
  embossing the reflective polarizing film to impart thereto a shape visible to the observer through the front substrate of the liquid crystal cell,
  depositing a transparent levelling layer in hollows on an upper face of the reflective polarizing film, an upper face of the levelling layer being parallel to an underside of the rear substrate,
  applying an adhesive layer to the upper face of the levelling layer, the adhesive layer being parallel to the underside of the rear substrate and the upper face of the levelling layer, and
  securing the reflective polarizing film to the underside of the rear substrate by securing the adhesive layer to the underside of the rear substrate.

2. The fabrication method according to claim 1, wherein the reflective polarizing film is embossed by being pressed against a mould having relief shapes corresponding to shapes desired to be imprinted on said reflective polarizing film.

3. The fabrication method according to claim 2, wherein the reflective polarizing film is pressed against the relief mould by creating an air vacuum.

4. The fabrication method according to claim 2, wherein said reflective polarizing film is heated when the reflective polarizing film is pressed against the relief mould.

5. The fabrication method according to claim 3, wherein said reflective polarizing film is heated when the reflective polarizing film is pressed against the relief mould.

6. The fabrication method according to claim 1, wherein the reflective polarizing film is embossed by insert injection moulding.

7. The fabrication method according to claim 1, wherein the adhesive layer is formed of an optically transparent adhesive being a pressure sensitive film.

8. The fabrication method according to claim 7, wherein the optically transparent adhesive is partially diffusive.

9. The fabrication method according to claim 1, wherein another transparent levelling layer is deposited on a back of the reflective polarizing film.

10. The fabrication method according to claim 1, wherein the transparent levelling layer is a photopolymerizable resin.

11. The fabrication method according to claim 10, wherein the transparent levelling layer is polymerized by ultraviolet radiation.

12. The fabrication method according to claim 1, wherein, before being embossed, the upper face of the reflective polarizing film is provided with a diffusion layer in order to create an at least partially diffuse reflection.

13. The fabrication method according to claim 1, wherein the reflective polarizing film comprises a reflective polarizer combined with an at least partially absorbent background layer arranged on a back of the reflective polarizer.

14. The fabrication method according to claim 13, wherein the at least partially absorbent background layer is black or coloured.

15. The fabrication method according to claim 14, wherein the black or coloured background layer is an ink layer or a laminated film applied to the back of the reflective polarizer, either before a shaping of said reflective polarizer, so that said black or coloured background layer is shaped at a same time as the reflective polarizer, or after the shaping of the reflective polarizer.

16. The fabrication method according to claim 13, wherein, when the background layer is partially absorbent, a backlight device is arranged underneath said background layer.

17. The fabrication method according to claim 14, wherein, when the background layer is partially absorbent, a backlight device is arranged underneath said background layer.

18. The fabrication method according to claim 15, wherein, when the background layer is partially absorbent, a backlight device is arranged underneath said background layer.

19. The fabrication method according to claim 1, wherein the reflective polarizing film comprises a reflective polarizer combined with an absorbent polarizer which is bonded to a back of the reflective polarizer, an assembly of the two reflective and absorbent polarizers being embossed simultaneously.

20. The fabrication method according to claim 1, wherein the reflective polarizing film comprises an absorbent polarizer combined with an at least partially reflective reflector arranged underneath the absorbent polarizer.

21. The fabrication method according to claim 20, wherein the reflector is metallic.

22. The fabrication method according to claim 20, wherein, when the reflector is partially reflective, a backlight device is arranged underneath the reflective polarizing film.

23. A liquid crystal display device comprising:
  a reflective or transflective liquid crystal cell including liquid crystal molecules aligned in a planar or vertical manner, said liquid crystal cell being formed of a transparent front substrate located on the side of an observer, and a transparent rear substrate which extends beneath, parallel to, and at a distance from the front substrate, said two front and rear substrates being joined to each other with a sealing frame which defines a sealed enclosure in which a liquid crystal composition is confined, the front and rear substrates being coated on opposite faces thereof with electrically conductive transparent electrodes and counter-electrodes, optical properties of the liquid crystal composition being modified by application of an electric field at a point of intersection between an electrode and a corresponding counter-electrode, the liquid crystal display device being provided with a reflective polarizing film to absorb a first component of light which enters the liquid crystal cell through the front substrate, and to reflect a second component of light polarized in a direction orthogonal to that of the first component, wherein the reflective polarizing film includes relief portions visible to an observer through the front substrate of the liquid crystal cell, wherein a transparent levelling layer is provided in hollows on an upper face of the reflective polarizing film, an upper face of the levelling layer being parallel to an underside of the rear substrate, wherein an adhesive layer is provided on the upper face of the levelling layer, the adhesive layer being parallel to the underside of the rear substrate and the upper face of the levelling layer, and wherein the reflective polarizing film being secured to the underside of the rear substrate by securing the adhesive layer to the underside of the rear substrate.

24. The liquid crystal display device according to claim 23, wherein the reflective polarizing film comprises a reflective polarizer combined with an at least partially absorbent background layer arranged on a back of the reflective polarizer.

25. The liquid crystal display device according to claim 24, wherein the at least partially absorbent background layer is black or coloured.

26. The liquid crystal display device according to claim 25, wherein the black or coloured background layer is an ink layer or a laminated film applied to the back of the reflective polarizer.

27. The liquid crystal display device according to claim 23, wherein the reflective polarizing film comprises a reflective polarizer combined with an absorbent polarizer which is bonded to a back of the reflective polarizer, an assembly of the reflective and absorbent polarizers being embossed.

28. The liquid crystal display device according to claim 23, wherein the reflective polarizing film comprises an absorbent polarizer combined with an at least partially reflective reflector arranged underneath the absorbent polarizer.

29. The liquid crystal display device according to claim 28, wherein the reflector is metallic.

30. The liquid crystal display device according to claim 28, wherein, when the reflector is partially reflective, a backlight device is arranged underneath said reflector.

31. A timepiece comprising a liquid crystal display device according to claim 23.

* * * * *